US012597765B2

(12) United States Patent
Gietl et al.

(10) Patent No.: US 12,597,765 B2
(45) Date of Patent: Apr. 7, 2026

(54) CIRCUIT BREAKER UNIT

(71) Applicant: Vitesco Technologies GmbH, Regensburg (DE)

(72) Inventors: Rainer Gietl, Regenstauf (DE); Martin Götzenberger, Ingolstadt (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 138 days.

(21) Appl. No.: 18/426,654

(22) Filed: Jan. 30, 2024

(65) Prior Publication Data

US 2025/0007271 A1    Jan. 2, 2025

Related U.S. Application Data

(63) Continuation of application No. PCT/EP2022/058131, filed on Mar. 28, 2022.

(30) Foreign Application Priority Data

Aug. 4, 2021    (DE) ..................... 10 2021 208 466.4

(51) Int. Cl.
   *H02H 3/087*        (2006.01)
   *H02H 7/26*         (2006.01)
(52) U.S. Cl.
   CPC ............ *H02H 3/087* (2013.01); *H02H 7/268* (2013.01)
(58) Field of Classification Search
   CPC ............................... H02H 7/268; H02H 3/087
   See application file for complete search history.

(56) References Cited

U.S. PATENT DOCUMENTS

| | | | | |
|---|---|---|---|---|
| 11,171,481 B1* | 11/2021 | Hudson | ................. | B60R 16/033 |
| 2018/0361961 A1* | 12/2018 | Maekawa | ............ | H01M 10/44 |
| 2020/0339051 A1 | 10/2020 | Schill | | |

(Continued)

FOREIGN PATENT DOCUMENTS

| | | |
|---|---|---|
| CN | 106024497 A | 10/2016 |
| CN | 107346882 A | 11/2017 |

(Continued)

OTHER PUBLICATIONS

European Search Report dated Jul. 14, 2022 for corresponding European Patent Application No. PCT/EP2022/058131.

(Continued)

*Primary Examiner* — Thienvu V Tran
*Assistant Examiner* — Christopher J Clark

(57)    ABSTRACT

The disclosure relates to a circuit breaker unit having a circuit breaker for connection of at least two electrical networks. The circuit breaker unit has a control unit for monitoring voltages of the networks and/or at least one current through the circuit breaker. In the event of one of the fault scenarios, overvoltage or undervoltage in one of the networks or overcurrent across the circuit breaker, the controller separates the two networks from one another. The circuit breaker includes at least one controllable first resistor, a controllable second resistor, and a controllable third resistor. The control unit is configured, in the event of a fault scenario in one of the networks, to adjust the values of the resistors so that the networks are separated from one another and so that the voltage in the fault-free network remains within predefined limits.

12 Claims, 5 Drawing Sheets

(56)     References Cited

U.S. PATENT DOCUMENTS

2022/0352705 A1 * 11/2022 Ramsauer .............. H02H 3/087
2023/0202410 A1 * 6/2023 Draese ..................... H02H 3/08
361/93.1

FOREIGN PATENT DOCUMENTS

| | | | |
|----|-------------|----|---------|
| DE | 10020141 | A1 | 10/2001 |
| DE | 102016220466 | A1 | 4/2018 |
| DE | 102018206269 | A1 | 6/2019 |
| DE | 102018201863 | A1 | 8/2019 |
| DE | 102018202987 | A1 | 8/2019 |
| DE | 102019205801 | A1 | 10/2020 |
| DE | 102019212473 | A1 | 2/2021 |
| WO | 2015024509 | A1 | 2/2015 |

OTHER PUBLICATIONS

German Search Office Action dated Feb. 7, 2022 for corresponding
German Patent Application No. 10 2021 208 466.4.

* cited by examiner

CIRCUIT BREAKER UNIT

CROSS-REFERENCE TO RELATED APPLICATIONS

This application claims the benefit of PCT Application PCT/EP2022/058131, filed Mar. 28, 2022, which claims priority to German Application 10 2021 208 466.4, filed Aug. 4, 2021. The disclosures of the above applications are incorporated herein by reference.

TECHNICAL FIELD

The disclosure relates to a circuit breaker unit having a circuit breaker for connecting at least two electrical systems. Furthermore, the disclosure relates to a method and a corresponding control unit for operating the circuit breaker.

BACKGROUND

Circuit breakers are used either directly at an electrical source or between two power supply systems (for example in 12 V and 48 V vehicle electrical systems for motor vehicles) which are connected to one another. These circuit breakers react to three fault modes: overcurrent, overvoltage, and undervoltage (with the special case of short circuit). These fault modes are triggered by reaching threshold values in current and voltage measurement.

Based on a measurement speed and based on threshold values for overcurrent, overvoltage, and undervoltage detection, known circuit breakers trip a disconnection of the source or two power supply systems which are connected to one another by the circuit breaker. In this case, the voltages may reach values which are critical for connected loads in both electrical power supply systems. The circuit breakers are able to a somewhat limited extent to limit the voltage, for example with the aid of suppressor diodes. In addition, known circuit breakers react very late to high currents, which necessitates a high number of power components because of the high energies which build up in the electrical systems. This leads to high costs both for the circuit breaker and for protective elements and storage devices in control units in order to overcome overvoltages and undervoltages.

SUMMARY

The disclosure provides an improved circuit breaker unit. One aspect of the disclosure provides a circuit breaker unit. The circuit breaker unit includes a circuit breaker and a control unit. The circuit breaker is used for connecting at least two electrical systems, which include a first electrical system and a second electrical system, to one another. The control unit is configured to monitor voltages of the electrical systems and/or at least one current through the circuit breaker and to disconnect the two electrical systems from one another by way of the circuit breaker when one of the fault cases of overvoltage or undervoltage in one of the electrical systems or overcurrent occurs. The circuit breaker includes at least one variable first resistance, one variable second resistance, and one variable third resistance, where all three resistances are in each case connected at a common node the first resistance is further connected to the first electrical system and the second resistance is connected to the second electrical system. Additionally, the third resistance is connected to a reference potential, such as ground. The control unit is configured, in a fault case in one of the electrical systems, to adjust the values of the resistances such that the electrical systems are disconnected from one another and that the voltage in the fault-free electrical system remains within predetermined limits.

Therefore, it is ensured that at least one of the at least two electrical systems remains able to supply the connected loads completely or in a satisfactory limited manner.

In some implementations, the three resistances of the circuit breaker can in each case be directly or indirectly connected to the node and/or directly or indirectly connected to the respective electrical system. For example, a shunt for current measurement or a diode or an inductance is positioned between the node and one of the resistances or between one of the resistances and one of the electrical systems, which therefore constitutes an indirect connection.

In some examples, a portion of the components of the circuit breaker unit is arranged in a housing and a different portion of the components is arranged in a different housing and the components are connected to one another via one or more lines.

The two electrical systems may be related to a reference potential, such as ground.

In some implementations, a disconnection of the two electrical systems may also be understood as a high-resistance connection (for example several megohms) of the two electrical systems via the correspondingly set resistances. By contrast, in the case of a low-resistance connection, the two electrical systems via the correspondingly set resistances are understood as connected to one another.

In some examples, a higher external logic deactivates the complete control of the circuit breaker unit. For example, it may be provided that a starter current flows via the circuit breaker when a vehicle is stationary. That would actually be an overcurrent event, but as it is to be expected and the circuit breaker should not trip, the function of the circuit breaker could be deactivated here.

In some implementations, an inductance is arranged in series to the first resistance and/or an inductance is arranged in series to the second resistance.

In some examples, the control unit is designed such, when adjusting the values of the resistances, that the electrical systems are disconnected from one another and that the voltage in the fault-free electrical system remains within predetermined limits, to actuate at least occasionally at least one of the resistances depending on values, which were detected or provided in predetermined time steps, for the voltage of the fault-free electrical system and/or for the voltage of the faulty electrical system and/or for the at least one current, such that the at least one resistance functions as a continuous linear controller.

The control unit may be configured, in the fault-free case, to set and/or to keep the first resistance and the second resistance to/at low resistance and the third resistance to/at high resistance.

For disconnecting the two electrical systems and for stabilizing the fault-free electrical system virtually in real time, a measurement speed of the parameters voltage and/or current may be provided, which is many times higher than a fundamental adjustment speed. Furthermore, a sufficiently accurate measurement with respect to the threshold values may take place in a sufficiently short time, for example 0.1 us to 20 μs, and a direct reaction of the circuit breaker may take place after these threshold values are reached or exceeded.

In some implementations, the control unit is configured, if the fault case of undervoltage occurs in one of the electrical systems, to set the first or second resistance connected to the fault-free electrical system to high resistance and shortly after that to set the third resistance to low resistance. This means that if the fault case of undervoltage occurs in the second electrical system, the first resistance is set to high resistance, and if the fault case of undervoltage occurs in the first electrical system, the second resistance is set to high resistance. For example, the control unit is configured to set the third resistance to low resistance directly after the first or the second resistance has reached a predetermined high-resistance value.

In some implementations, the control unit is configured, if the fault case of overcurrent occurs in one of the electrical systems, to increase the first or second resistance connected to the fault-free electrical system and to set the third resistance to low resistance. This means that if the fault case of overcurrent occurs in the second electrical system, the first resistance is increased, and if the fault case of overcurrent occurs in the first electrical system, the second resistance is increased. The increase of the first or the second resistance takes place such that the voltage in the fault-free electrical system remains within the predetermined limits for the system voltages. The increase of the first or the second resistance takes place depending on values, which were detected or provided in predetermined time steps, for the voltage of the fault-free electrical system and/or for the voltage of the faulty electrical system and/or for the at least one current.

In the case of undervoltage and overcurrent, it is possible to proceed as follows:

The first and second resistance, which are designed as transistors, are connected in the direction of one of the connected electrical systems using a drain terminal in each case and connected directly or indirectly at the node using a source terminal. The first and second resistance are actuated from conductive to non-conductive via their respective gate, that is to say switched off. The switch-off speed of both transistors should be of such a size that a current that is building up should not reach such a level that would lead to one of the two transistors being outside of its specified values when switching off this current. The transistors must not be damaged by the disconnection and must withstand this switch-off pulse repetitively. Here, the term switch-off speed is to be understood more broadly. For correct control, the total time results from the times: time for the voltage measurement and/or current measurement, running time of the digital filter, gating time of the transistor and the total pulse duration of the switch-off pulse.

In some examples, it is ensured that when reconnecting the electrical systems, the transistors can withstand the full pulse again at any time without damage. Thermal aspects can be taken into account in the control of the circuit breaker for this.

Due to the current, there is an inductive energy in a circuit-breaker lead inductance of the fault-free electrical system, which leads to an increase in the voltage when the first resistance, which is formed as a transistor, is switched off. If this current is sufficiently large, then the voltage may go beyond a defined overvoltage limit, for example 16 V. Then, the gate of the resistance, which is formed as a transistor and is connected to the fault-free electrical system, is actuated (switched on) anew such that by reopening or by reducing the linear resistance, the voltage is adjusted to the defined overvoltage limit, for example 16 V. This takes place until the current ideally reaches the value zero and therefore the total energy in the circuit-breaker lead inductance is dissipated. The fault-free electrical system therefore remains at least approximately within the specified voltage limits.

So that there is no interaction of the two circuit-breaker lead inductances (the values of which lie between 0.3 µH and 8 µH and furthermore may also be unequal), the third resistance, which is formed for example as a transistor or from two anti-series connected transistors or from two parallel transistors or from four anti-series and parallel transistors, should become conductive. Due to the unknown energies and induction values of the circuit-breaker lead inductances, a non-adjustable state would be set without the low-resistance connection of the first and second resistance to the reference potential, for example to ground. In addition, the energies in the transistors would potentially lead to a destruction.

In some implementations, the control unit is configured, when the fault case of overvoltage occurs in one of the electrical systems, to adjust the resistance connected to the faulty electrical system such that an undervoltage caused by a line inductance in the fault-free electrical system on the side of the fault-free electrical system does not fall below the predetermined limits, where the third resistance remains at or is set to high resistance and the resistance connected to the fault-free electrical system is likewise set to high resistance after the dissipation of a current in the line inductance. The resistance connected to the faulty electrical system is therefore actuated such on the side of the fault-free electrical system, depending on an undervoltage caused by a line inductance in the fault-free electrical system, that it functions as a continuous linear controller. The resistance which is realized as a transistor retains its diode function for the case when the fault-free electrical system is highly inductively connected. The current to be dissipated can then freewheel in the third resistance.

For example, if there is an occurrence of an overvoltage of the first and second resistances, which may be formed as transistors for example, there is a switch to high resistance (switch off). Directly following the switching off, the gate of the transistor, the drain terminal of which is pointed to the faulty electrical system, is actuated such that the voltage in the fault-free electrical system only falls to a defined lower threshold value. Due to the inductive discharge of the circuit-breaker lead inductance in the fault-free electrical system, the voltage would otherwise become lower than this lower threshold value, potentially even negative. Therefore, the third resistance, which is formed as a transistor, is not activated, in order to not let the voltage at the node decrease.

In some implementations, the resistances are formed as semiconductor components, such as transistors, for example MOSFETs, bipolar transistors, IGBTs, GaN HEMTs and/or SiC semiconductors.

In some examples, the circuit breaker unit can be configured to be supplied with power redundantly from the at least two connected electrical systems. Furthermore, a separate power supply, which is independent of the connected electrical systems, is also conceivable, which separate power supply only has the same reference potential reference, such as ground reference, on the output side. An own supply inside the control unit due to the storage device is also conceivable.

In some implementations, at least one of the resistances is designed redundantly. For example, a multiplicity of variants having anti-parallel or anti-series paths and combinations thereof is conceivable, which are all connected directly or indirectly to the node.

Other aspects of the disclosure provide a method and a corresponding control unit for operating a circuit breaker. The circuit breaker is designed for connecting a group of electrical systems. The group of electrical systems has at least one first electrical system and one second electrical system. The circuit breaker includes at least one variable first resistance, one variable second resistance, and one variable third resistance, where all three resistances are in each case directly or indirectly connected at a common node. The first resistance is further directly or indirectly connected to the first electrical system and the second resistance is directly or indirectly connected to the second electrical system. The third resistance is connected to a reference potential, such as ground. In the method, the voltages of the electrical systems and/or at least one current through the circuit breaker are monitored. Furthermore, if one of the fault cases of overvoltage or undervoltage in one of the electrical systems or overcurrent occurs, the values of the resistances are adjusted by way of the circuit breaker such that the electrical systems are disconnected from one another and that the voltage in the fault-free electrical system remains within predetermined limits.

In some examples, the adjustment of the values of the resistances, so that the electrical systems are disconnected from one another and that the voltage in the fault-free electrical system remains within predetermined limits, that at least one of the resistances is actuated at least occasionally depending on values, which were detected or provided in predetermined time steps, for the voltage of the fault-free electrical system and/or for the voltage of the faulty electrical system and/or for the at least one current, such that the at least one resistance functions as a continuous linear controller.

The solution according to the disclosure can stabilize a redundantly structured voltage supply, for example for 12 V, in the event of a fault. This leads to improvement of the fail-safety. Furthermore, costs are reduced compared to solutions known from the prior art.

Due to the virtually real-time reaction of the circuit breaker, it is possible to keep the voltage values of the undamaged branch within a margin, which is defined in advance, without one providing additional components, for example for voltage limiting, which components would additionally have to be switchable in order to allow special cases such as permitted jump-start. By means of this margin, one ensures that all components in this branch retain their function completely or to a permitted limited extent. Thus, an uncontrolled restart of a component is prevented. This condition leads to a significant increase in the fail-safety.

The circuit breaker unit can be used in a battery monitoring system and in all devices in which electrical short circuits can, for example, be caught and isolated in real time.

In some examples, the circuit breaker unit is used for the case-by-case connection or disconnection of a plurality of electrical systems in a motor vehicle.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The present disclosure is to disconnect two electrical systems, which are coupled to one another in a low-resistance manner, from one another such in the event of a fault in one of the electrical systems that the respectively other electrical system remains functional completely or to a limited extent. If both electrical systems have an electrical source which is dimensioned such that it can carry the electrical load of this electrical system, then the possibility is created of building a redundant electrical system with extremely high fail-safety. An electrical dependence is created due to the low-resistance connection. This dependence necessitates disconnection if a fault occurs, which disconnection stabilizes the non-faulty electrical system within voltage limits which are to be specified. Therefore, it is ensured that at least one of the two electrical systems remains fully functional. The following fault situations may occur: 1) undervoltage; 2) overcurrent; 3) overvoltage.

The actual cause for a failure (for example sagging of a source, short circuit in a load) is essentially irrelevant, as such a failure is always expressed in one of the three fault situations mentioned.

Figure 1:
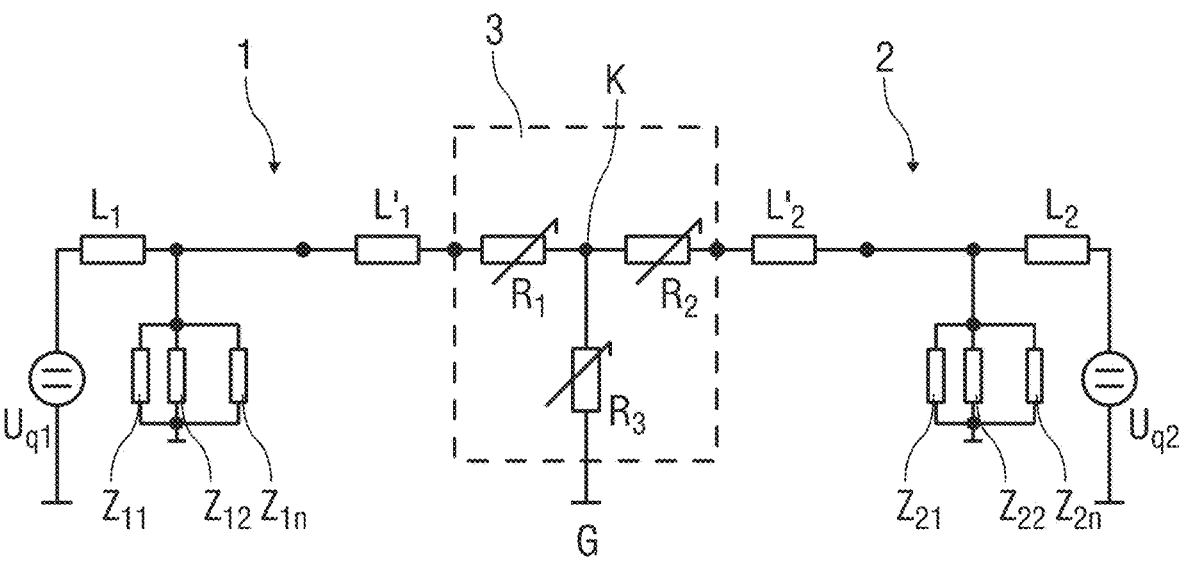
FIG. 1 shows a schematic view of an exemplary circuit breaker unit having a circuit breaker arranged between a first electrical system and a second electrical system.

FIG. 1 is a schematic view of an exemplary electronic circuit for solving all three fault situations in the form of a circuit breaker unit 3 having a circuit breaker which is arranged between a first electrical system 1 and a second electrical system 2.

The circuit breaker includes at least one variable first resistance $R_1$, one variable second resistance $R_2$, and one variable third resistance $R_3$. All three resistances $R_1$ to $R_3$ are in each case directly or indirectly connected to a common node K. The first resistance $R_1$ is further directly or indirectly connected to the first electrical system 1 and the second resistance $R_2$ is directly or indirectly connected to the second electrical system 2. The third resistance $R_3$ is connected to a reference potential G, such as ground.

The first electrical system 1 is represented by a voltage source $U_{q1}$ and one or more loads, which are illustrated in the present case as parallel-connected complex resistances $Z_{11}$, $Z_{12}$, $Z_{1n}$ (for example applications with pin capacitances and inductive portions). A supply line between the voltage source $U_{q1}$ and the loads has a source lead inductance $L_1$. A supply line between the first electrical system 1 and the circuit breaker has a circuit-breaker lead inductance $L'_1$.

The second electrical system 2 is represented by a voltage source $U_{q2}$ and one or more loads, which are illustrated in the present case as parallel-connected complex resistances $Z_{21}$, $Z_{22}$, $Z_{2n}$ (for example applications with pin capacitances and inductive portions). A supply line between the voltage source $U_{q2}$ and the loads has a source lead inductance $L_2$. A supply line between the second electrical system 2 and the circuit breaker has a circuit-breaker lead inductance $L'_2$.

The voltage sources $U_{q1}$, $U_{q2}$ can have a voltage which is arbitrary, but is equal for both voltage sources $U_{q1}$, $U_{q2}$, unless one of the voltage sources $U_{q1}$, $U_{q2}$ is additionally a storage device (for example, a lead battery). In this case, different voltage values may be set during a charging process. A larger number of voltage sources may be provided in at least one of the electrical systems 1, 2. Furthermore, it is conceivable that more than two electrical systems are coupled to one another by way of the circuit breaker and correspondingly adjusted by the circuit breaker.

A value of the source lead inductances $L_1$, $L_2$ from the voltage sources $U_{q1}$, $U_{q2}$ to the loads is not known at the time of the design of the circuit breaker.

A necessary minimum inductance, for example 0.5 pH, results for the circuit-breaker lead inductances $L'_1$, $L'_2$ in each case, depending on the dimensioning of the circuit of the circuit breaker, in order to maintain the required voltage limit on the undamaged side in the event of a voltage sag on the fault side. If this minimum inductance is not present in the respective supply line at the required level, then a corresponding inductance can be provided in the circuit breaker in series to the respective circuit-breaker lead inductance $L'_1$, $L'_2$. Although the circuit-breaker lead inductances $L'_1$, $L'_2$ are voltage-stabilizing on the functional side, they may increase stored energies, which must be dissipated in the resistance $R_1$, $R_2$.

In the event of a fault in one of the electrical systems 1, 2, the values of the resistances $R_1$, $R_2$, $R_3$ are adjusted such that both electrical systems 1, 2 can be disconnected from one another and that the voltage values on the undamaged side move within desired limits.

In a normal state, the first and second resistances $R_1$ and $R_2$ are of low a resistance as possible, for example less than 100 milliohms or less than 30 milliohms, such as less than 1 milliohm, and the third resistance $R_3$ is of as high a resistance as possible, for example more than 1 kiloohm, such as several megohms.

Figure 2:
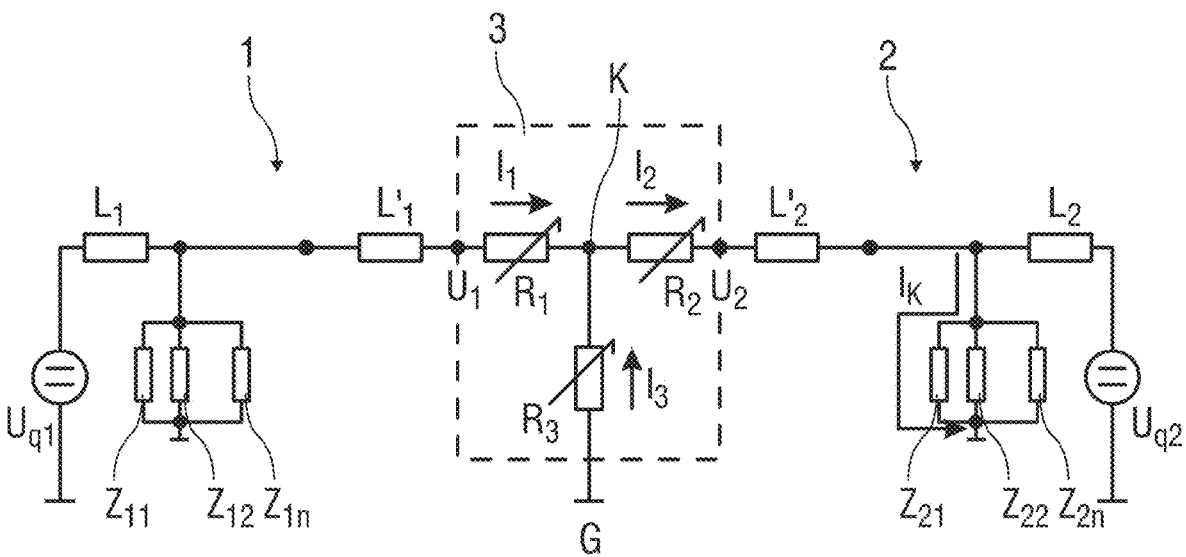
FIG. 2 shows a schematic view of the circuit breaker unit having the circuit breaker when an undervoltage, for example a short circuit, occurs in the second electrical system.

FIG. 2 is a schematic view of the circuit breaker unit 3 having the circuit breaker which is arranged between the first electrical system 1 and the second electrical system 2 when an undervoltage occurs in the second electrical system 2.

In the event of undervoltage occurring in one of the electrical systems 1, 2, for example in the event of a short circuit in the second electrical system 2, a rapidly increasing short circuit current Ix is created, which reduces a voltage $U_2$ at a terminal of the circuit breaker for the second electrical system 2, that is to say at the second resistance $R_2$. Therefore, due to the low-resistance connection, a voltage $U_1$ is also reduced at a terminal of the circuit breaker for the first electrical system 1, that is to say at the first resistance $R_1$.

A change rate of the two voltages $U_1$, $U_2$ is limited definitively by the source lead inductances $L_1$, $L_2$ and the pin capacitances at the measuring points of the voltages $U_1$ and $U_2$.

When predetermined threshold values of the voltages $U_1$, $U_2$ are fallen below, the resistances $R_1$, $R_2$ and $R_3$ are changed such that:
  a) the two electrical systems 1, 2 are disconnected from one another or, following the discharge of the source lead inductances $L_1$ and $L_2$, are only still connected to one another with very high resistance.

b) the voltage $U_1$ does not increase above a desired threshold value of the voltage in the first electrical system 1 during the inductive discharge of the source lead inductance $L_1$.
  c) the inductive discharge of the source lead inductance $L_2$ can take place via the low-resistance third resistance $R_3$.

In this case, a time is not known at which a first current $I_1$ through the first resistance $R_1$ is zero and at which a second current $I_2$ through the second resistance $R_2$ is equal to a third current $I_3$ through the third resistance $R_3$. However, after a short waiting time, for example shortly after the first resistance $R_1$ becomes high resistance, the third resistance $R_3$ should become low resistance. The waiting time may for example be a few μs, such as less than 10 μs.

Therefore, in general terms, the resistance $R_1$ or $R_2$ of the circuit breaker, which is connected to the faulty electrical system 1 or 2, should first become high resistance and shortly thereafter, the third resistance $R_3$ of the circuit breaker, which leads to the reference potential G, such as to ground, should become low resistance. If the resistances $R_1$, $R_2$, $R_3$ are formed as transistors, for example MOSFETs, bipolar transistors, IGBTs, GaN HEMTs and/or SiC semiconductors (silicon carbide), the resistance $R_1$ or $R_2$ which is connected to the faulty electrical system 1, 2 can also be switched off after the waiting time. The inductive pulse due to the inductance in the faulty electrical system 1, 2 can in this case freewheel via a body diode of the resistance $R_1$ or $R_2$ which is formed as a transistor.

The fault itself is not overcome by the circuit breaker unit 3. The two electrical systems 1, 2 can be reconnected to one another as soon as the fault is eliminated and the values in both electrical systems 1, 2 lie within predetermined threshold values.

For example, the third resistance $R_3$ can initially be set to high resistance and subsequently, for example after a short waiting time, the resistance $R_1$, $R_2$ connected to the previously faulty electrical system can be set to low resistance. In this case, the reconnection may have a thermal dependence due to the transistors. For example, the circuit breaker disconnects and the electrical systems 1, 2 recover. Due to a massive temperature rise in the resistances R1 and/or R2, a pulse of this type may possibly not be accommodated instantaneously.

Figure 3:
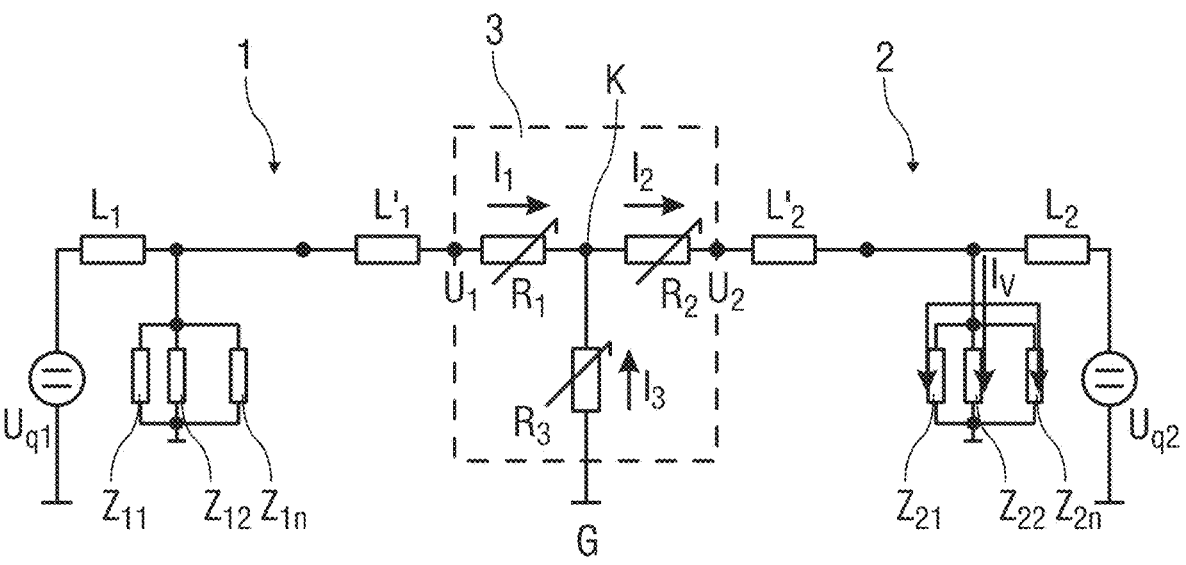
FIG. 3 shows a schematic view of the circuit breaker unit having the circuit breaker when an overcurrent occurs in the second electrical system.

FIG. 3 is a schematic view of the circuit breaker unit having the circuit breaker which is arranged between the first electrical system 1 and the second electrical system 2 when an overcurrent occurs in the second electrical system 2.

Should too high a current be created via the first resistance $R_1$ and the second resistance $R_2$, for example because of too high a load current $I_v$ through the load in the second electrical system 2, although the predetermined values for the voltages $U_1$ and $U_2$ are complied with, a disconnection of the two electrical systems 1, 2 may likewise be tripped.

In order to stabilize the electrical system 1, the following conditions are to be fulfilled:
  a) The first resistance $R_1$ should increase so fast or so slowly that in the event of the inductive discharge of the source lead inductance $L_1$, the voltage $U_1$ does not exceed a desired voltage value. If the first resistance $R_1$ is formed as a transistor, then its gate is controlled such that the voltage $U_1$ does not exceed a desired voltage value.
  b) The inductive discharge of the circuit-breaker lead inductances $L'_1$ and $L'_2$ takes place again with the aid of the third resistance $R_3$ in that this is set to low resistance, for example after a waiting time of 5 μs to 10 μs after the increase of the first resistance $R_1$. Depending on whether the first current I1 or the second current I2 is first zero, the freewheel path, that is to say the body diode with a low-resistance third resistance $R_3$ accepts the current of the respective other path.

Therefore, in general terms, the resistance $R_1$ or $R_2$ of the circuit breaker, which is connected to the fault-free electrical system 1 or 2, should first increase and subsequently the third resistance $R_3$ of the circuit breaker, which leads to the reference potential G, such as to ground, should become low resistance.

For the cases of undervoltage and overcurrent, for disconnecting the two electrical systems 1, 2 and for stabilizing the fault-free electrical system virtually in real time, a measurement speed of the parameters voltage ($U_1$ or $U_2$) and/or current ($I_1$ or $I_2$) may be provided, which is many times higher than a fundamental adjustment speed. Furthermore, a sufficiently accurate measurement with respect to the threshold values should take place in a sufficiently short time, for example 0.1 us to 20 us and a direct reaction of the circuit breaker unit 3 or the circuit breaker should take place after these threshold values are reached or exceeded.

In this case, it is possible to proceed as follows:

The resistances $R_1$ and $R_2$ which are formed as transistors are in each case connected using the terminal drain at the points $U_1$ and $U_2$ shown in FIG. 2 and using the terminal source directly or indirectly at the node K, and are actuated via their respective gate from conductive to non-conductive, that is to say switched off. The switch-off speed of both transistors should be of such a size that a current that is building up should not reach such a level that would lead to one of the two transistors being outside of its specified values when switching off this current. The transistors must not be damaged by the disconnection and must withstand this switch-off pulse repetitively.

Due to the first current $I_1$, there is an inductive energy in the circuit-breaker lead inductance $L'_1$ of the fault-free electrical system 1, which leads to an increase in the voltage $U_1$ when the first resistance $R_1$, which is formed as a transistor, is switched off. If the first current $I_1$ is sufficiently large, then the voltage $U_1$ may go beyond a defined overvoltage limit, for example 16 V. Then, the gate of the first resistance $R_1$, which is formed as a transistor, is actuated (switched on) anew such that by reopening or by reducing the linear resistance, the voltage $U_1$ is adjusted to the defined overvoltage limit, for example 16 V. This takes place until the first current $I_1$ ideally reaches the value zero and therefore the total energy in the circuit-breaker lead inductance $L'_1$ is dissipated. The first electrical system 1 therefore remains at least approximately within the specified voltage limits.

So that there is no interaction of the two circuit-breaker lead inductances $L'_1$ and $L'_2$ (the values of which lie between 0.3 μH and 8 μH and furthermore may also be unequal), the third resistance $R_3$, which is formed as a transistor or from two anti-series-connected transistors, should become conductive. Due to the unknown energies and induction values of the circuit-breaker lead inductances $L'_1$ and $L'_2$, a non-adjustable state would be set without the low-resistance connection of the two resistances $R_1$ and $R_2$ with respect to the reference potential G, such as ground. In addition, the energies in the transistors would potentially lead to a destruction.

Figure 4:
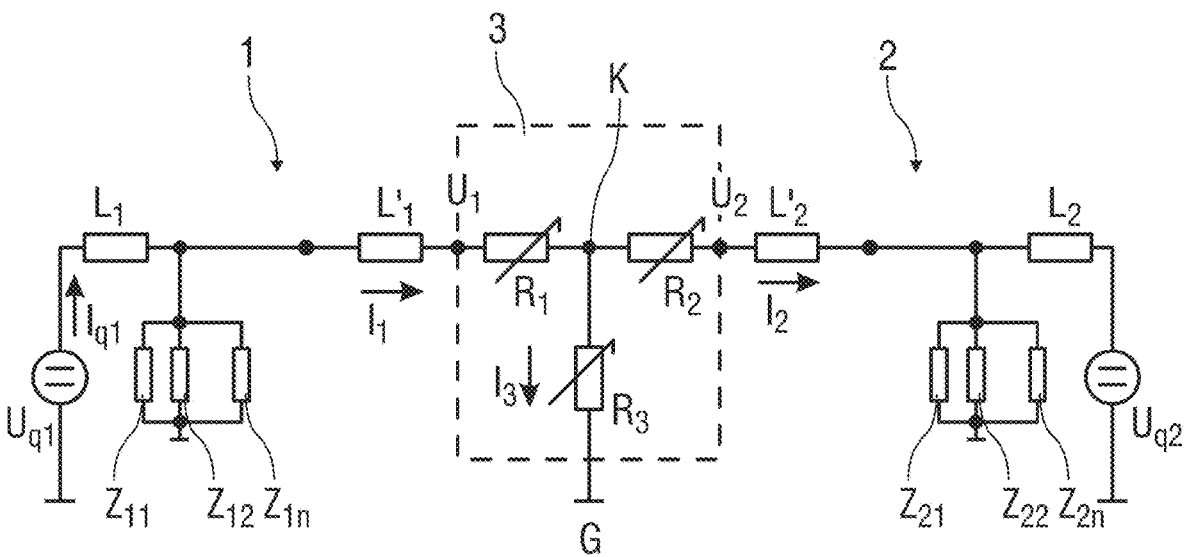
FIG. 4 shows a schematic view of the circuit breaker unit having the circuit breaker when an overvoltage occurs in the first electrical system.

FIG. 4 is a schematic view of the circuit breaker unit 3 having the circuit breaker which is arranged between the first electrical system 1 and the second electrical system 2 when an overvoltage occurs in the first electrical system 1.

Due to a damaged voltage source, for example $U_{q1}$, there may be a strong increase in a current $I_{q1}$ flowing out of the voltage source $U_{q1}$ and the voltage $U_1$ may exceed the predetermined threshold value. In this case, the electrical system to be stabilized is the second electrical system 2. Therefore, at least one of the resistances $R_1$ to $R_3$, for example the first resistance $R_1$, should be changed such that:

a) the inductive discharge of the source lead inductance $L_2$ does not lead to the voltage $U_2$ falling below the predetermined value, b) the first resistance $R_1$ is or becomes high resistance in order to dissipate the first current $I_1$, c) the first resistance $R_3$ is adjusted such that the voltage $U_2$ is not connected to the reference potential G, such as ground, in a low-resistance manner as long as the second current $I_2$ is not equal to zero and the second resistance $R_2$ is high resistance.

In this case, the first resistance $R_1$ should be voltage-proof enough that no damage is caused at the circuit breaker.

Therefore, in general terms, the resistance $R_1$, $R_2$ which is connected to the faulty electrical system 1, 2 in each case is adjusted such that an undervoltage caused by a line inductance in the respectively fault-free electrical system 1, 2 on the side of the fault-free electrical system 1, 2 does not fall below the predetermined limits, wherein the third resistance $R_3$ remains at or is set to high resistance and the resistance $R_1$, $R_2$ connected to the fault-free electrical system 1, 2 is likewise set to high resistance after the dissipation of a current in the line inductance.

For the case of overvoltage, for disconnecting the two electrical systems 1, 2 and for stabilizing the fault-free electrical system virtually in real time, a measurement speed of the parameters voltage ($U_1$ or $U_2$) and/or current ($I_1$ or $I_2$) may be provided, which is many times higher than a fundamental adjustment speed. Furthermore, a sufficiently accurate measurement with respect to the threshold values should take place in a sufficiently short time, for example 0.1 μs to 20 μs and a direct reaction of the circuit breaker unit 3 or the circuit breaker should take place after these threshold values are reached or exceeded.

When an overvoltage occurs, both resistances $R_1$, $R_2$, which may be formed as transistors for example, are switched to high resistance (switched off). Directly following the switching off, the gate of the transistor, the drain terminal of which is pointed to the faulty electrical system 1, is actuated such that the voltage $U_2$ only falls to a defined lower threshold value. Due to the inductive discharge of the circuit-breaker lead inductance $L'_2$, the voltage $U_2$ would otherwise become lower than this lower threshold value, potentially even negative. Therefore, the third resistance $R_3$, which is formed as a transistor, is also not activated, in order to not let the voltage at the node K decrease.

Figure 5:
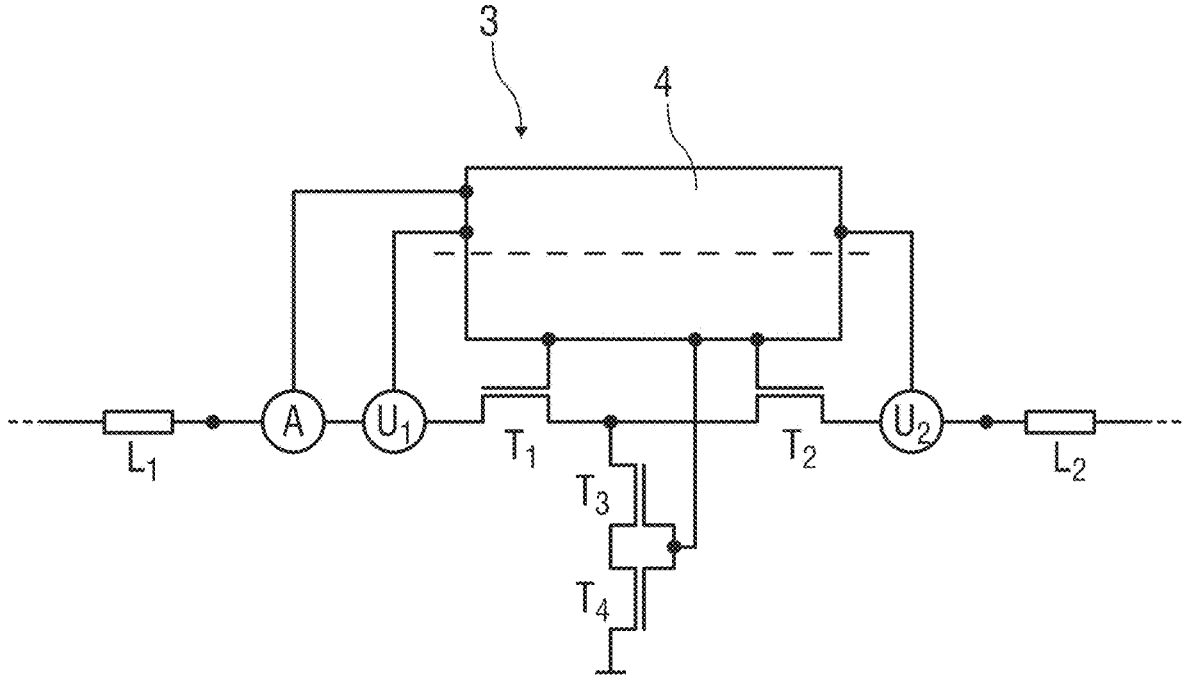
FIG. 5 shows a schematic view of an exemplary circuit breaker unit.

FIG. 5 is a schematic view of an example of the circuit breaker unit 3 of a circuit breaker which can, for example, be installed into a 12 V supply system of a vehicle, such as a car. In general, numerous varying implementations of circuit breakers 3 are possible.

The variable resistances $R_1$ to $R_3$ can be formed as semiconductor components, for example transistors. Depending on the actuation, these semiconductor components may have values of less than 1 milliohm up to several megohms. In some examples, the transistors may be realized as N-channel MOSFETs. In the circuit breaker unit 3, a very fast measurement of the voltages $U_1$, $U_2$ and the current I1 and/or I2 and an actuation of the resistances $R_1$, $R_2$, $R_3$ at a high measurement frequency, for example up to several MHz, takes place, for example, by way of a measuring unit. The measuring unit may be arranged with the circuit breaker in a housing. Alternatively, the control unit may include the measuring unit.

The circuit breaker, the control unit, and the measuring unit may be arranged in a housing. Alternatively it is possible that the circuit breaker or, in the case of redundant, that is to say multiple realization of the circuit breaker, the circuit breakers, the control unit, and the measuring unit are arranged in at least two separate housings which are arranged set apart from one another in a vehicle.

In FIG. 5, the resistances $R_1$ and $R_2$ are formed by the transistors $T_1$, $T_2$. The resistance $R_3$ is formed by two transistors $T_3$, $T_4$ that are connected in series.

The voltages $U_1$ and $U_2$, which are decisive as control variables, may be permanently monitored. To this end, the voltages U1 and U2 can be detected in predetermined time steps. The measurement of the current I1 and/or I2 as triggering criterion can likewise take place permanently. Likewise, solutions are conceivable, in which the monitoring and/or measurement does not take place permanently, for example by switching off the monitoring and/or measurement.

If the desired voltage or current values are exceeded or fallen below, then the transistors $T_1$ to $T_4$ are to be actuated such that the undamaged electrical system 1 or 2 remains within certain limits. This means that the actuation of the gates of the transistors takes place exactly at the speed at which the inductive discharges of the source lead inductances $L_1$ and $L_2$ do not lead to the voltages $U_1$ and/or $U_2$ exceeding or falling below the predetermined values.

In some examples, an own power supply is provided for the control unit 4, as the circuit breaker, just like any other component, is dependent on at least one stable supply. This means that the own power supply is likewise implemented twice from both electrical systems in an OR arrangement. Alternatively or in addition, external power supplies are conceivable. If a stable voltage $U_1$ and/or $U_2$ is secured, then the supply of the circuit breaker unit 3 is also assured.

The transistor $T_4$ in FIG. 5 is used solely as reverse polarity protection and is not absolutely necessary.

The current measurement may take place at any desired point along the horizontal section via the resistances $R_1$ and $R_2$. For example, the current I2 can be measured instead of the current I1. Measurement of the current I3 is not provided in the example shown in FIG. 5. However, measurement of the current I3 may additionally be provided in alternative implementations.

Instead of MOSFETs, other semiconductor components, for example bipolar transistors, IGBTs, GaN HEMTs and/or SiC semiconductors, may also be used.

Figures 6A, 6B, 6C, 6D:
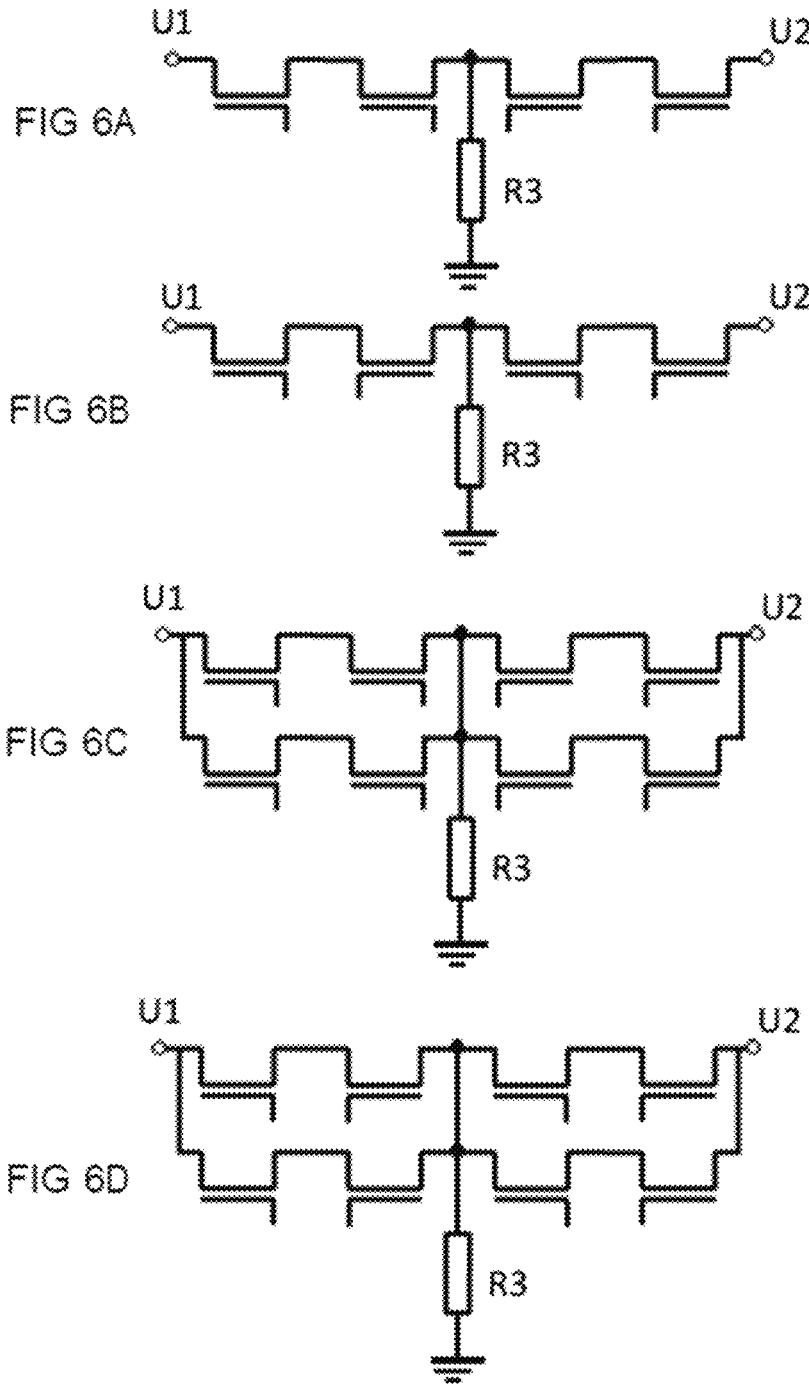
FIGS. 6 *a*)-*d*) show various exemplary redundantly designed circuit breakers.
Figures 7A, 7B, 7C:
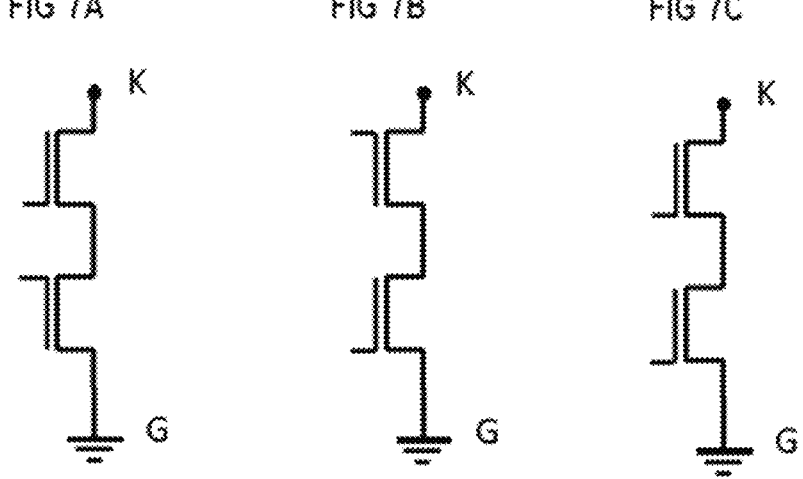
FIGS. 7 *a*)-*e*) show various exemplary design of a third resistance of the circuit breaker.
Figures 7D, 7E:
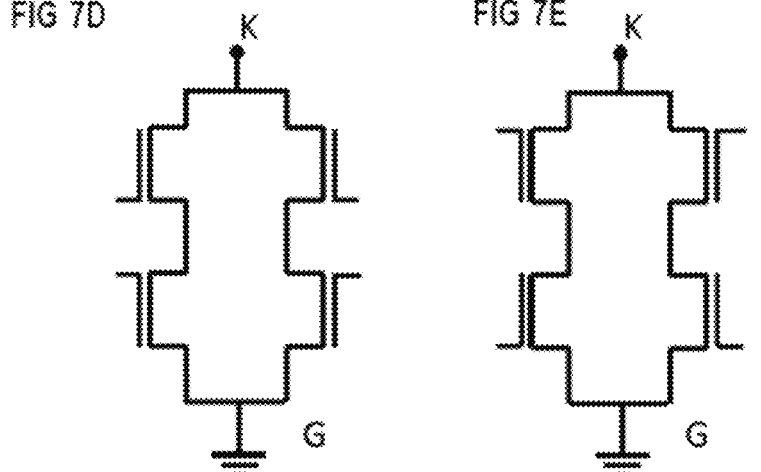

In one examples, the paths via T1, T2 and/or T3 may be structured redundantly, for example by way of a series, anti-series or parallel transistor to T1 and/or T2, also in order to enable cyclic testing during operation and in order to ensure full fail-safety in the case of damage. FIG. 6 shows various examples of redundantly designed circuit breakers, such as for the respective sections between the system voltage nodes, at which the voltages of the electrical systems U1, U2 are applied in each case and the common node K. FIG. 7 shows various examples for a design of the third resistance of the circuit breaker.

Too fast an opening or uncontrolled opening of the connection, that is to say via the semiconductor components, such as the transistors $T_1$, $T_2$ and/or $T_3$, may lead to under- or overvoltages on one terminal or both terminals of the semiconductor component. This can be avoided by way of linear control of at least a portion of the semiconductor components used, such as by actuating the semiconductor component such that these behave like variable linear resistances.

A number of implementations have been described. Nevertheless, it will be understood that various modifications may be made without departing from the spirit and scope of the disclosure. Accordingly, other implementations are within the scope of the following claims.

LIST OF REFERENCE SIGNS

1 First electrical system
2 Second electrical system
3 Circuit breaker unit
4 Control unit
G Reference potential
$I_1$ First current
$I_2$ Second current
$I_3$ Third current
$I_k$ Short circuit current
$I_v$ Load current
$I_{q1}$ Current
K Node
$L_1$ Source lead inductance
$L_2$ Source lead inductance
$L'_1$ Circuit-breaker lead inductance
$L'_2$ Circuit-breaker lead inductance
$R_1$ First resistance
$R_2$ Second resistance
$R_3$ Third resistance
$T_1$ to $T_4$ Transistors
$U_1$ Voltage
$U_2$ Voltage
$U_{q1}$ Voltage source
$U_{q2}$ Voltage source
$Z_{11}$, $Z_{12}$, $Z_{1n}$ Complex resistances
$Z_{21}$, $Z_{22}$, $Z_{2n}$ Complex resistances
What is claimed is:

1. A circuit breaker unit comprising:
a circuit breaker for connecting at least two electrical systems, the at least two electrical systems include a first electrical system and a second electrical system, the circuit breaker includes:
at least one variable first resistance,
at least one variable second resistance,
at least one variable third resistance, and
a common node, all three resistances are in each case directly or indirectly connected at the common node, the first resistance is directly or indirectly connected to the first electrical system and the second resistance is directly or indirectly connected to the second electrical system, the third resistance is connected to a reference potential; and
a control unit configured to monitor voltages of the electrical systems and/or at least one current through the circuit breaker and to disconnect the two electrical systems from one another by way of the circuit breaker when a fault case of overvoltage or undervoltage in one of the electrical systems or overcurrent occurs,
wherein when a fault case occurs in one of the electrical systems, the control unit adjusts values of the resistances such that the electrical systems are disconnected from one another and that the voltage in a fault-free electrical system remains within predetermined limits, and wherein when the control unit adjusts the values of the resistances such that the electrical systems are disconnected from one another and the voltage in the fault-free electrical system remains within predetermined limits, it actuates at least occasionally at least one of the resistances depending on values, which were detected or provided in predetermined time steps, for the voltage of the fault-free electrical system and/or for the voltage of the faulty electrical system and/or for the at least one current, such that the at least one resistance functions as a continuous linear controller.

2. The circuit breaker unit of claim 1, wherein an inductance is arranged in series to the first resistance of the circuit breaker and/or an inductance is arranged in series to the second resistance of the circuit breaker.

3. The circuit breaker unit of claim 1, wherein in fault-free case, the control unit sets the first resistance and the second resistance to low resistance and sets the third resistance to high resistance.

4. The circuit breaker unit of claim 2, wherein when the fault case of undervoltage occurs in one of the electrical systems, the control unit sets the first or second resistance connected to the fault-free electrical system to high resistance and shortly after the control unit sets the third resistance to low resistance.

5. The circuit breaker unit of claim 1, wherein when the fault case of overcurrent occurs in one of the electrical systems, the control unit increases the first or second resistance connected to the fault-free electrical system and sets the third resistance to low resistance.

6. The circuit breaker unit of claim 1,
wherein when the fault case of overvoltage occurs in one of the electrical systems, the control unit adjusts the resistance which is connected to the faulty electrical system such that an undervoltage caused by a line inductance in the fault-free electrical system on a side of the fault-free electrical system does not fall below the predetermined limits for the voltage, and
wherein the third resistance remains at or is set to high resistance and the resistance connected to the fault-free electrical system is likewise set to high resistance after a dissipation of a current in the line inductance.

7. The circuit breaker unit of claim 1, wherein the resistances are formed as semiconductor components.

8. The circuit breaker unit of claim 7, wherein the semiconductor components are transistors including MOSFETs, bipolar transistors, IGBTs, GaN HEMTs and/or SiC semiconductors.

9. The circuit breaker unit of claim 1, wherein the at least two connected electrical systems supply the circuit breaker unit with power redundantly.

10. The circuit breaker unit of claim 1, wherein at least one of the resistances is designed redundantly.

11. A method for operating a circuit breaker connecting a group of electrical systems, the group of electrical systems includes at least one first electrical system and one second electrical system, the method comprising:
providing one variable first resistance, one variable second resistance, and one variable third resistance, the first resistance is directly or indirectly connected to the first electrical system and the second resistance is directly or indirectly connected to the second electrical system, the third resistance is connected to a reference potential;
providing a common node, all three resistances are in each case directly or indirectly connected at the common node;
monitoring, at a control unit, voltages of the electrical systems and/or at least one current through the circuit breaker; and
when a fault case of overvoltage or undervoltage in one of the electrical systems or overcurrent occurs, adjusting values of the resistances by way of the circuit breaker such that the electrical systems are disconnected from one another and that the voltage in a fault-free electrical system remains within predetermined limits, and
wherein the adjustment of the values of the resistances such that the electrical systems are disconnected from one another and that the voltage in the fault-free electrical system remains within predetermined limits includes at least one of the resistances being actuated at least occasionally depending on values, which were detected or provided in predetermined time steps, for the voltage of the fault-free electrical system and/or for the voltage of the faulty electrical system and/or for the at least one current, such that the at least one resistance functions as a continuous linear controller.

12. A control unit for operating a circuit breaker that connects a group of electrical system, the group of electrical systems includes at least one first electrical system and one second electrical system, the control unit executing a method comprising:
monitoring voltages of the electrical systems and/or at least one current through the circuit breaker, wherein a first variable resistance is directly or indirectly connected to the first electrical system and a second variable resistance is directly or indirectly connected to the second electrical system, a third variable resistance is connected to a reference potential, and all three resistances are in each case directly or indirectly connected at a common node; and
when a fault case of overvoltage or undervoltage in one of the electrical systems or overcurrent occurs, adjusting values of the resistances by way of the circuit breaker such that the electrical systems are disconnected from one another and that the voltage in a fault-free electrical system remains within predetermined limits, and
wherein the adjustment of the values of the resistances such that the electrical systems are disconnected from one another and that the voltage in the fault-free electrical system remains within predetermined limits includes at least one of the resistances being actuated at least occasionally depending on values, which were detected or provided in predetermined time steps, for the voltage of the fault-free electrical system and/or for the voltage of a faulty electrical system and/or for the at least one current, such that the at least one resistance functions as a continuous linear controller.

* * * * *